Nov. 3, 1953     C. E. BANNISTER     2,657,880

PARACHUTE-EQUIPPED HELICOPTER

Filed Nov. 20, 1951

INVENTOR.
CLYDE E. BANNISTER

BY *Willard D. Eakin*

ATTORNEY

Patented Nov. 3, 1953

2,657,880

UNITED STATES PATENT OFFICE 2,657,880

PARACHUTE-EQUIPPED HELICOPTER

Clyde E. Bannister, Houston, Tex.

Application November 20, 1951, Serial No. 257,331

8 Claims. (Cl. 244—17.15)

1

This invention relates to the combination of a helicopter and a parachute associated therewith for lowering the helicopter in an emergency such as the disabling of the rotor by breaking of a blade or otherwise.

Its chief objects are to provide an arrangement such that the disabled rotor, and preferably parts associated with it, can be released and caused to be removed from the body of the helicopter, so that partial functioning of the rotor will not occur and interfere with orderly descent of the body of the vehicle, and so that the rotor will not be in the way of a parachute carried by the helicopter below the hub of the rotor.

Figure 1:
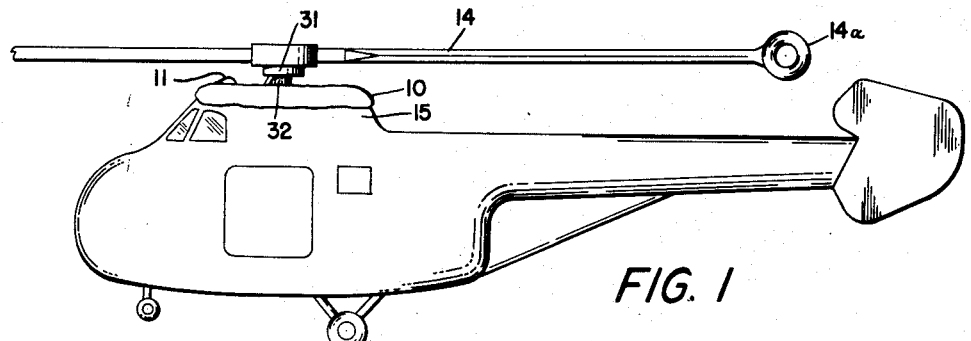
Fig. 1 is an elevation of a helicopter equipped with a parachute and embodying my invention in its preferred form.
Figure 2:
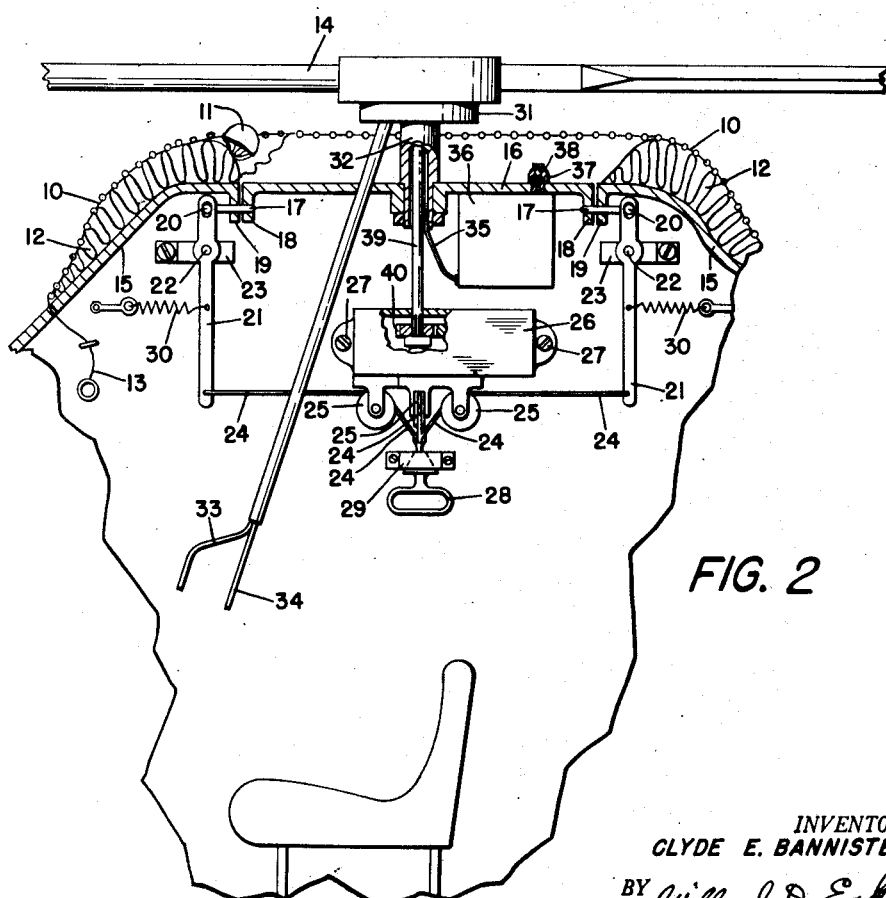
Fig. 2 is a fragmentary section of the same, with parts in elevation.

A parachute 10, connected to the helicopter by suitable shroud lines, not shown, having its central vent hole of suitably large diameter, in a suitable annular pack 12 having a pull cord 13, and provided with a pilot chute 11, is mounted below the central part of the rotor 14, on the top of the pod 15, with the parachute and pack surrounding a panel 16 releasably occupying a hole in the roof of the pod.

The helicopter here shown is of the type in which the motive power is provided by ram-jet motors, such as the one shown at 14ª, mounted upon the outer ends of the rotor blades.

The panel 16 is releasably held in place by a circumferentially spaced set of radial latching pins 17, 17 each occupying registered holes in a pair of downwardly projecting ears 18, 19 formed respectively on the periphery of the panel and on the hole-defining margin of the roof of the pod.

At its outer end each of the radial latching pins has pin-and-slot connection at 20 to a vertical lever 21 fulcrumed at 22 on a bracket 23 mounted on the inner wall of the pod. The lower arm of each of these levers is connected by a radial cable 24 trained over a respective pulley of a central set of pulleys 25, 25 which are mounted on the lower face of a gear-and-equipment box 26 secured by bolts 27, 27 to the inner wall of the pod.

At their inner ends the several radial cables 24 are secured to the conical head of a handle-and-stop member 28, the head of which, as a stop, seats in a complemental hole extending through a bracket 29 mounted upon the inner wall of the

2 pod, and thus limits the recoil of pull springs 30, 30 which connect the respective levers 21 with the wall of the pod and yieldingly hold the respective pins 17 in their latching positions.

The mounting of the rotor comprises a non-rotating hollow head 31 on a tubular standard 32 centrally mounted upon and extending through the panel 16, the head 31 containing suitable connections, not shown, for conventional control elements 33, 34 and for a fuel line 35 leading to the head 31 from a fuel tank 36 secured to the under face of the releasable panel 16. The fuel tank is provided with a filling spout 37 having a check valve 38 so that initial air pressure can be imposed upon the fuel in the tank to start the feed of the fuel to the motors, 14ª, the check valve then permitting air to enter the tank so that the fuel can continue to be fed to the motors by the centrifugal force of fuel in the parts of the fuel lines that are in the blades of the rotor.

The rotor, driven by the ram jet motors, serves as a source of power for equipment such as an electric generator or a pump mounted in the box 26, and for this purpose a shaft 39 driven by the rotor extends downward through the tubular standard 32 and has its lower end slip-splined in the hub of a driving gear 40 in the box 26.

The construction as shown and described is such that upon releasing of the panel 16 by manual pulling of the handle 28, the panel and all of the parts mounted upon it, including the fuel tank, the shaft 39 and the control elements 33, 34, will be withdrawn from the rest of the vehicle, by continued rotation of a damaged rotor or by resistance of a dead rotor, in the descent of the vehicle, the ones of said parts that are below the panel passing through the panel hole and through the vent hole of the parachute. When those several parts have thus been cleared from the pod, and from the parachute mounted upon the pod, the parachute can be released by manual pulling of its rip-cord 13, without danger of fouling of the parachute by the rotor or by rotor structure.

Variations are possible without departure from the scope of the invention as defined in the appended claims.

I claim:

1. The combination of a helicopter and a parachute therefor, the helicopter comprising a vehicle body and a rotor positioned above said body and releasably mounted thereon, and means for releasably securing the parachute in packed condition on said body below said rotor, the combination including means for alternatively holding and freeing said rotor in relation to said body and means for thereafter releasing said parachute.

2. A combination as defined in claim 1 and comprising a releasable journal mounting for the rotor and means for releasably latching said journal mounting to the body of the helicopter.

3. A combination as defined in claim 1 and comprising a releasable journal mounting for the rotor and means for releasably latching said journal mounting to the body of the helicopter and in which the parachute is formed with a central vent aperture and is so packed that the said journal mounting is withdrawable through the said vent aperture.

4. A combination as defined in claim 1 in which parts associated with the recited rotor and releasable therewith are inclusive of a fuel tank in association with the recited rotor.

5. A combination as defined in claim 1 in which parts associated with the recited rotor and releasable therewith are inclusive of a hand-engaged manual-control member in association with the recited rotor.

6. A combination as defined in claim 1 in which parts associated with the recited rotor and releasable therewith are inclusive of a power shaft.

7. A combination as defined in claim 1 and comprising a releasable panel upon which the recited rotor is mounted the helicopter body being formed with an opening in which the said panel is releasably mounted as a part of a wall of said body.

8. A combination as defined in claim 1 including gearing mounted in the body of the helicopter and a power shaft extending from the hub of the rotor to said gearing and having such slip-splined relation to at least one of the two that it is withdrawable therefrom by movement of the rotor away from said body.

CLYDE E. BANNISTER.

References Cited in the file of this patent

UNITED STATES PATENTS

| Number | Name | Date |
| --- | --- | --- |
| 1,435,190 | Van Leggelo | Nov. 14, 1922 |
| 1,702,422 | Stevens | Feb. 19, 1929 |
| 1,851,129 | Reardan | Mar. 29, 1932 |
| 1,879,632 | O'Brien | Sept. 27, 1932 |
| 2,227,204 | Sepko | Dec. 31, 1940 |
| 2,308,802 | Barling | Jan. 19, 1943 |

FOREIGN PATENTS

| Number | Country | Date |
| --- | --- | --- |
| 17,437 | Great Britain | of 1915 |